May 26, 1936.  I. BACH ET AL  2,042,288
CONTAINER FOR BAKERY PRODUCTS
Filed April 23, 1935   2 Sheets-Sheet 1

INVENTORS
LOUIS M. LIPOWSKY
IRVING BACH
BY Richards & Geier
ATTORNEYS

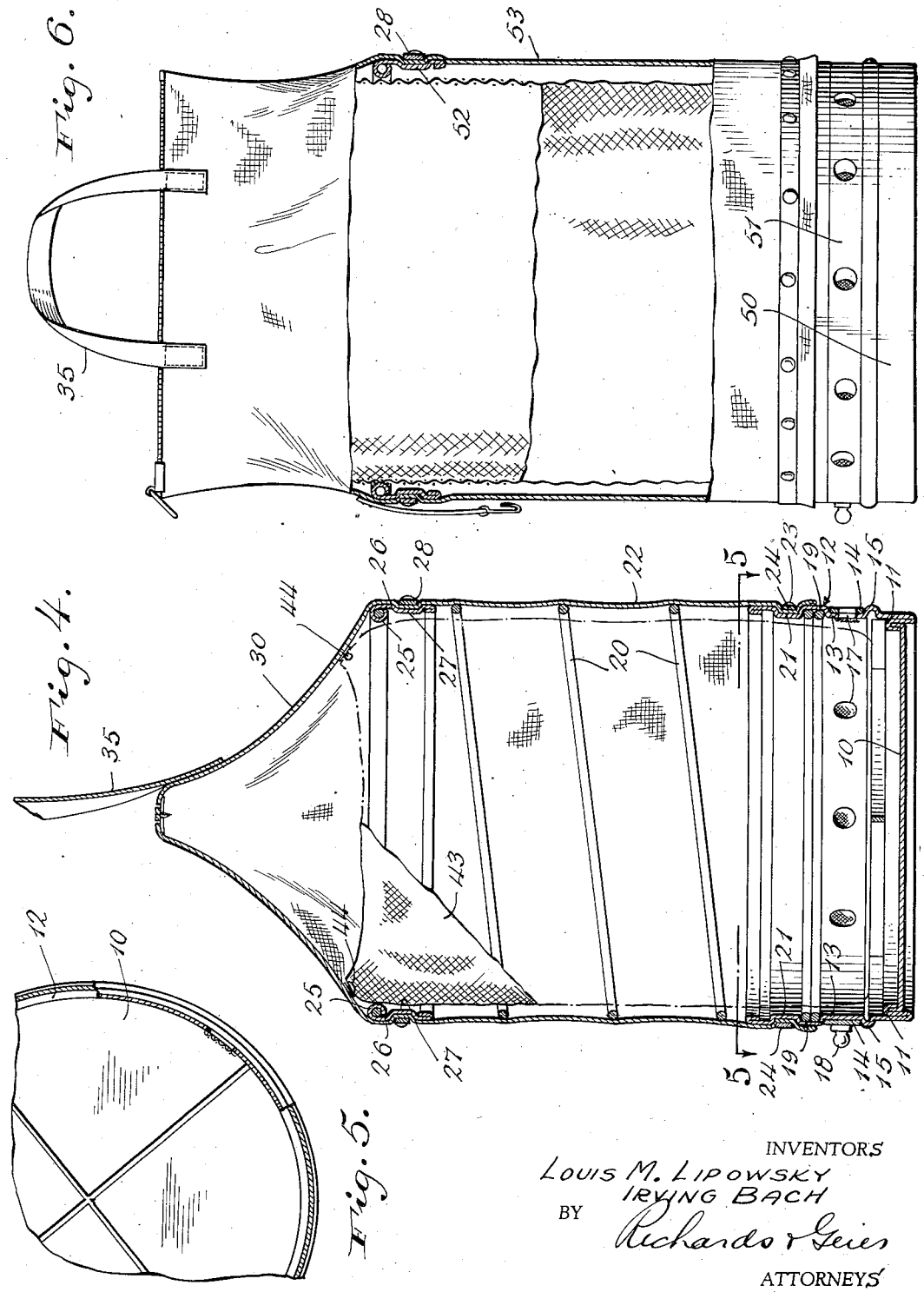

Patented May 26, 1936

2,042,288

UNITED STATES PATENT OFFICE 2,042,288

CONTAINER FOR BAKERY PRODUCTS

Irving Bach and Louis Meyers Lipowsky, Brooklyn, N. Y.

Application April 23, 1935, Serial No. 17,778

6 Claims. (Cl. 150—49)

This invention relates to containers and refers more particularly to containers for foodstuffs, such as bread, rolls and other bakery products.

Bread and rolls are usually delivered to bakeries, groceries and other retail stores very early in the morning when the stores are closed. It has become the custom of depositing these bakery products in paper bags or the like, in front of the locked store. This procedure is extremely unsanitary and the products are often stolen or damaged by adverse weather conditions. The cost of paper bags used for these deliveries is quite high. In some cities and states where the depositing of foodstuffs in paper bags in front of a locked store is forbidden by ordinances or statutes, it has become the practice to provide a wooden box in front of the store for this purpose. Such wooden boxes, however, do not eliminate the possibility of theft and foodstuffs deposited in these boxes are often damaged by rain, heat or atmospheric moisture.

An object of the present invention is the provision of a container for foodstuffs and the like, which is weather-proof and which is provided with ventilating means capable of being adjusted in accordance with the varying weather conditions.

Another object is the provision of a container adapted for use by larger baking concerns when supplying bakery products to the retail stores, said container having resilient collapsible sidewalls to facilitate the filling thereof.

A further object of the present invention is the provision of a container which has a safety-lock making it possible to leave the container in front of a closed store without the risk that its contents may be stolen.

A still further object is the provision of containers which are inexpensive to manufacture, which comply with all sanitary requirements and which may be used for the delivery of foodstuffs for many years without the necessity of replacement.

The above and other objects of the present invention may be realized through the provision of a container which is made of moisture-proof material and which is provided with ventilating openings, the width of which may be adjusted depending upon the weather conditions prevailing at the time of delivery. The top portion of the container has an opening which may be securely closed and locked, and also carries a chain, by means of which the container may be hung in a safe place or attached to a doorknob and the like.

In a preferred form of the inventive idea, the side-walls of the container are supported by resilient means, to enable an easy filling thereof and are made collapsible, thereby facilitating the return of the empty container after use, and the storage of a number of containers in the factory.

The invention will appear more clearly from the following detailed description when taken in connection with the accompanying drawings showing preferred embodiments of the inventive idea.

In the drawings:

Figure 4 is a cross section through a container.

Figure 5 is a cross section along the line 5—5 of Figure 4.

Figure 6 shows partly in section and partly in side elevation a container of a somewhat different form.

Figure 3:
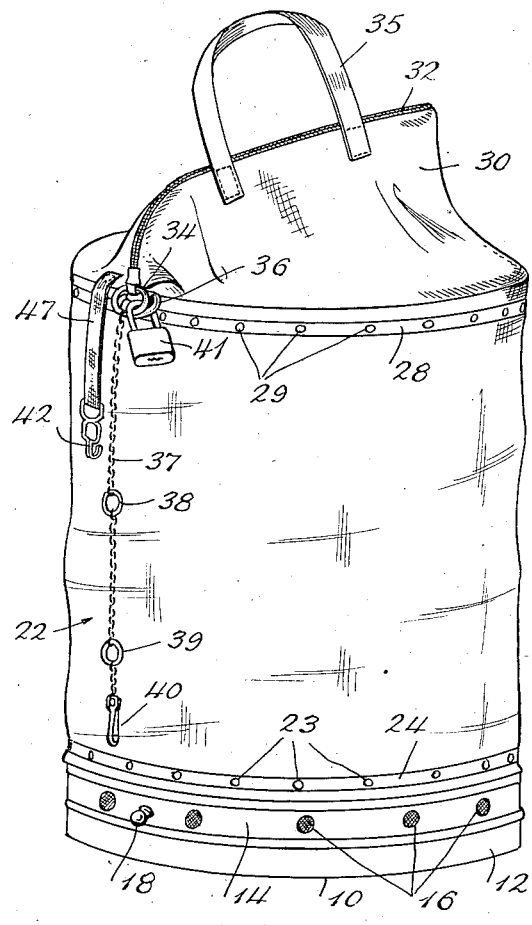
Figure 3 is similar to Figure 1 and illustrates the container while it is locked.

The container illustrated in Figures 1 to 5 of the drawings comprises a bottom 10 supported by flanges 11 of an annular bottom frame 12. The middle portion 13 of the frame 12 is provided with openings 17, which are preferably covered by wire mesh, and is surrounded by a band 14 supported by a rib 15 forming a part of the frame 12. The band 14 is provided with a number of openings 16 which are spaced at convenient distances from each other and which may be made to coincide with the openings 17 of the frame 12.

The band 14 is rotatable around the member 13 and carries a set screw or a handle 18 by means of which the position of the band 14 in relation to the openings 17 may be conveniently adjusted.

The upper part of the frame member 12 comprises a projecting rib portion 19 which in the example illustrated surrounds two complete turns of a supporting coiled spring 20. An annular indentation 21 is provided above the rib 19 and is connected with the lower edges of a bag 22 which is made of a moisture-proof material, such as impregnated canvas.

As shown in the drawings, a band 24 is used for holding tightly the bag-shaped member 22 upon the bottom frame 12. Split rivets 23 or the like, which pass through the bag 22 and through suitable openings formed in the band 24 and the frame 12, may be used for providing a more permanent connection between the bag 22 and the frame 12.

The spring 20 surrounding the bottom 10 of the container extends along the entire side walls thereof and the uppermost turn of this spring is situated within a groove formed by the flange 25 of an annular top frame 26. The frame 26 is provided with an annular recessed or indented portion 27 carrying a band 28. The canvas bag 22 is passed between the recess 27 and the band 28 and is attached to the frame 26 by the pressure of this band and/or by means of split rivets 29 which pass through the band 28, the canvas bag 22 and the recessed portion 27 of the frame 26.

Figure 1:
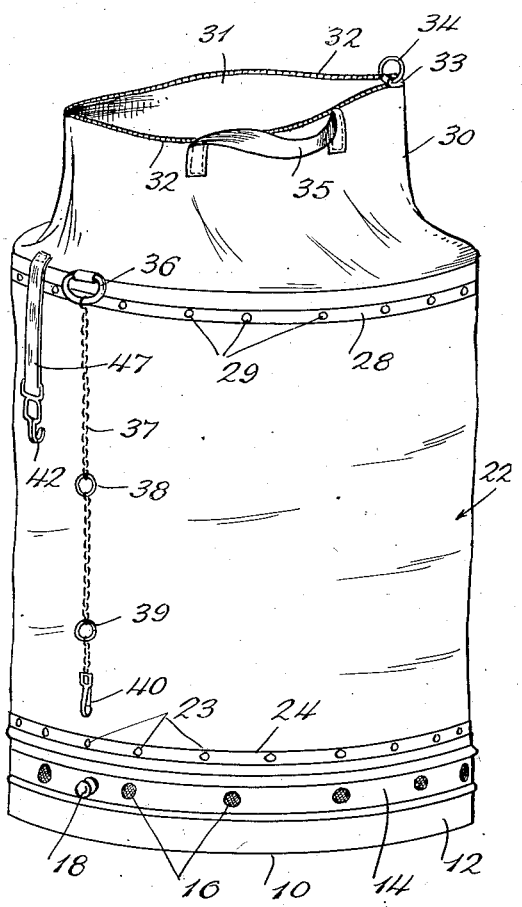
Figure 1 is a perspective view of an opened container.
Figure 2:
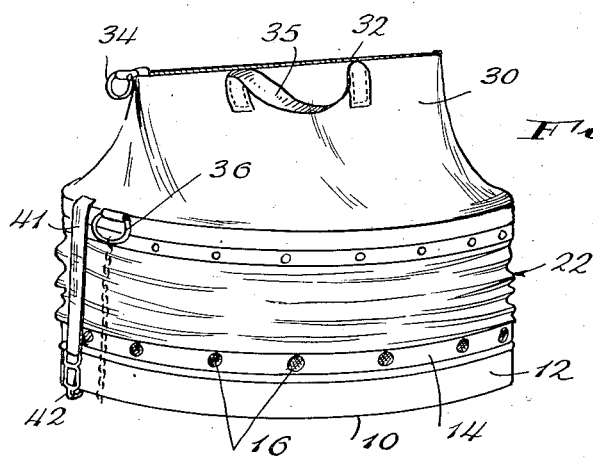
Figure 2 shows the empty container in its collapsed state.

As shown more clearly in Figures 1 to 3 of the drawings, the top portion 30 of the canvas bag 22 comprises two converging pieces the edges of which form an opening 31 and carry interlocking teeth 32. A movable zipper 33 of the standard construction is carried by the top portion 30 of the canvas bag and is adapted to securely close the opening 31. The zipper 33 is provided with a ring 34. A handle 35 made of a textile material may be sewn to the upper portion 30 of the bag 22.

Another ring 36 is sewn to the canvas bag 22 and is situated close to the edge of the top frame 26. The ring 36 carries a chain 37 provided with two rings 38 and 39 and ending in a hook 40.

As shown more clearly in Figure 3 of the drawings, the container may be securely locked by moving the zipper 33 from right to left (looking in the direction of Figure 1) and by passing a lock 41 around the rings 34 and 36.

The chain 37 and the hook 40 may be used for attaching the container to a doorknob or for hanging it in a safe place.

A strap 47 carrying a hook 42, is attached to the bag 22 close to the upper frame 26. Another similar strap is provided at the opposite side of the container.

As shown in Figure 2, the spring 22 may be compressed when the container is empty, and the hooks 42 may be placed around the lower edges of the frame 12. Due to this arrangement, the container may be maintained in its collapsed state while it is not in use.

As shown in Figure 4 of the drawings, a bag 43 which is preferably made of porous textile material is situated within the container and is removably attached to the bag 22 by snaps 44 sewn to the inner walls of the top portion 30 of the canvas bag.

The bag 43 may be conveniently removed and replaced by another one, as soon as it becomes soiled.

The containers are filled in the factory or main bakery while they are in the position shown in Figure 1. Then the containers are closed by operating their zippers 33 and are loaded upon a truck for delivery to the retail stores. Before leaving each container in front of the store, the driver adjusts the ring 14 in order to maintain the contents of the bag 43 in a fresh state. In hot weather, the ring 14 should be adjusted in such manner that the greatest possible ventilation is provided for the bakery products. In rainy or damp weather, the openings 17 should be closed either totally or partly by the ring 14. The container is securely locked in the manner shown in Figure 3 and/or its chain 37 is wound around the door-knob or the like to prevent any tampering with its contents.

The container shown in Figure 6 of the drawings is substantially similar to that illustrated in Figures 1 to 5, and comprises a bottom frame 50, a ventilating ring 51, a top frame 52 and side walls 53. The container illustrated in Figure 6 is devoid of any resilient supporting means which would maintain its walls 53 in an upright position while the bag is being filled.

What is claimed is:

1. A container for foodstuffs and the like, comprising a bottom, an annular frame connected with said bottom and having openings formed therein, a rotatable band surrounding a portion of said frame and carried thereby, said band having openings adapted to coincide with the openings of said frame, the ventilation of the interior of said container being varied by adjusting the position of said band upon said frame, a moisture-proof bag-shaped member connected with said frame and having an opening formed therein, means for locking the last-mentioned opening, an inner bag made of a porous material and situated within said moisture-proof member and means for detachably connecting said inner bag to the inner walls of said moisture-proof bag-shaped member.

2. A container for foodstuffs and the like, comprising a bottom, an annular bottom frame connected with said bottom and having an annular indented portion provided with openings, an outer rotatable band carried by said indented portion and having openings adapted to coincide with the openings of said indented portion, an annular top frame, a moisture-proof bag-shaped member having cylindrical side walls connected with said bottom frame and said top frame and a top portion provided with an opening; means connected with said top portion for locking the last-mentioned opening, an inner bag made of a porous material and adapted to be removably attached to the inner surface of said top portion, and a handle attached to said top portion.

3. A container for foodstuffs and the like, comprising a bottom, an annular bottom frame connected with said bottom and having an annular indented portion provided with openings, an outer rotatable band carried by said indented portion and having openings adapted to coincide with the openings of said indented portion, an annular top frame, a moisture-proof bag-shaped member having cylindrical side walls connected with said bottom frame and said top frame and a top portion provided with an opening; means connected with said top portion for closing the last-mentioned opening, a ring carried by said means, another ring connected with an outer surface of said bag-shaped member and situated adjacent to the last-mentioned opening, a chain having one end attached to the last-mentioned ring, a hook carried by the other end of said chain, an inner bag made of a porous material and adapted to be removably attached to the inner surface of said top portion, and a handle attached to said top portion.

4. A container for foodstuffs and the like, comprising a bottom, an annular bottom frame connected with said bottom and having openings formed therein, an outer rotatable band carried by said bottom frame and having openings adapted to coincide with the openings of said bottom frame, an annular top frame, a moisture-proof bag-shaped member having cylindrical side walls connected with said bottom frame and said top frame and a top portion provided with an opening; a coiled spring having turns which are in contact with said bottom frame and said top frame and adapted to support said side walls in an erect position, and means connected with said top portion for locking the last-mentioned opening.

5. A container for foodstuffs and the like, comprising a bottom, a frame connected with said bottom and having openings formed therein, a rotatable band surrounding a portion of said frame, said band having openings adapted to coincide with the openings of said frame, a bag-shaped member connected with said frame, said bottom and said frame constituting the bottom portion of said bag-shaped member, the ventilation of the interior of said bag-shaped member being varied by adjusting the position of said band upon said frame, and means for detachably connecting an inner bag to the inner walls of said bag-shaped member.

6. A container for foodstuffs and the like, comprising a bottom, an annular bottom frame connected with said bottom and having an annular indented portion provided with openings, an outer rotatable band carried by said indented portion and having openings adapted to coincide with the openings of said indented portion, and a moisture-proof bag-shaped member having cylindrical side walls connected with said bottom frame, the ventilation of the interior of said bag-shaped member being varied by adjusting the position of said band upon said frame.

IRVING BACH.
LOUIS MEYERS LIPOWSKY.